No. 666,506. Patented Jan. 22, 1901.
D. C. FULTON.
APPARATUS FOR HITCHING OR UNHITCHING HORSES.
(Application filed Nov. 15, 1900.)
(No Model.)
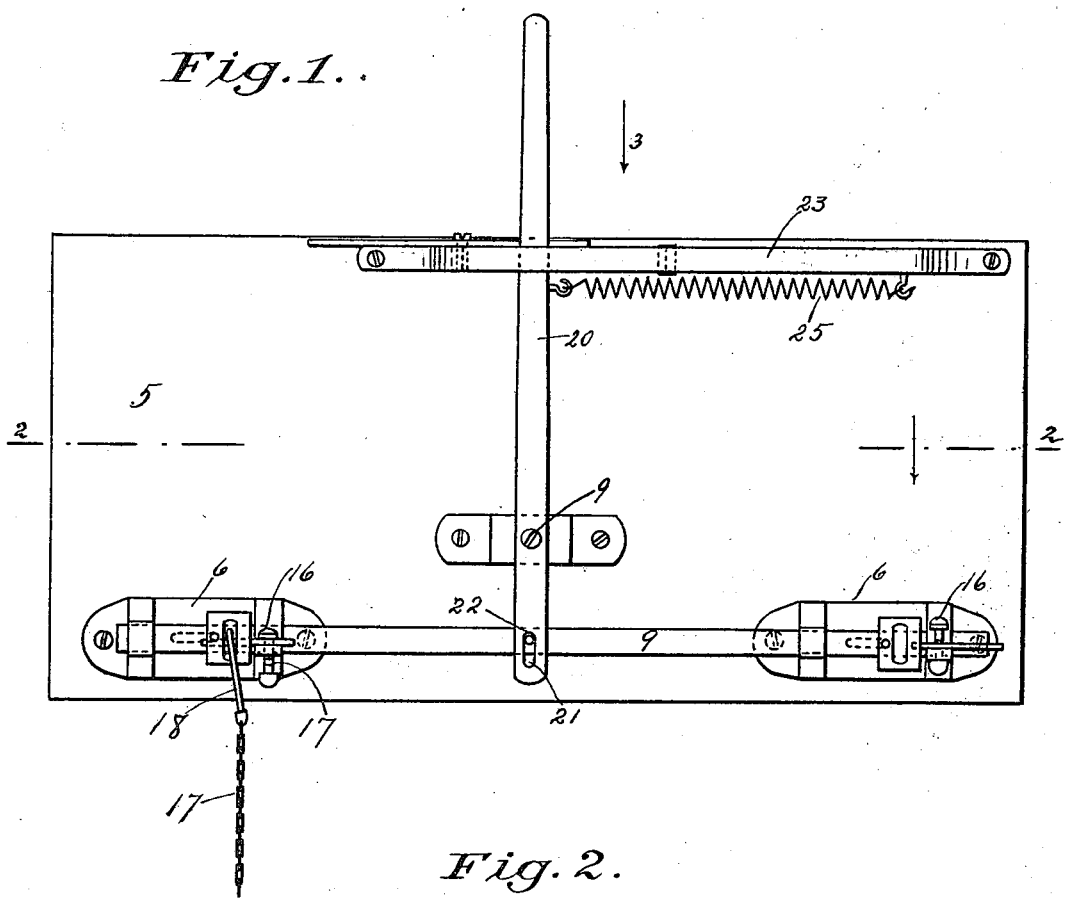
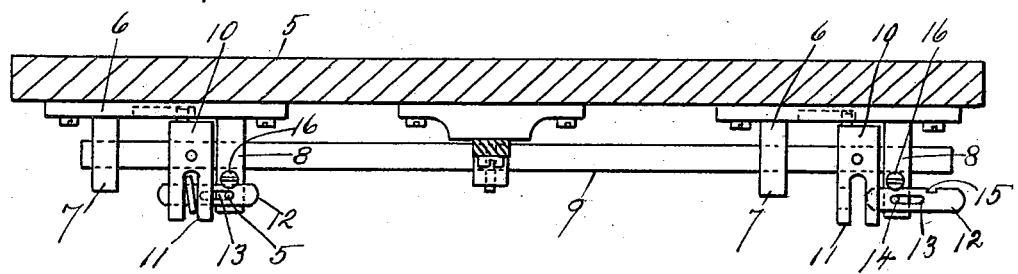
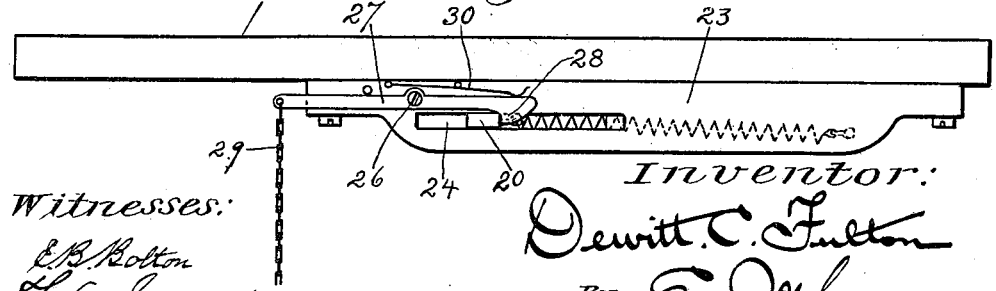
Witnesses:
E. B. Bolton
F. A. Stewart
Inventor:
Dewitt C. Fulton
By Edgar Oates
his Attorneys
THE NORRIS PETERS CO., PHOTO-LITHO., WASHINGTON, D. C.

UNITED STATES PATENT OFFICE.

DEWITT C. FULTON, OF NEWMARKET, NEW JERSEY.

APPARATUS FOR HITCHING OR UNHITCHING HORSES.

SPECIFICATION forming part of Letters Patent No. 666,506, dated January 22, 1901.

Application filed November 15, 1900. Serial No. 36,569. (No model.)

*To all whom it may concern:*

Be it known that I, DEWITT C. FULTON, a citizen of the United States, residing at Newmarket, in the county of Middlesex and State of New Jersey, have invented certain new and useful Improvements in Apparatus for Hitching or Unhitching Horses, of which the following is a full and complete specification, such as will enable those skilled in the art to which it appertains to make and use the same.

This invention relates to devices for hitching and unhitching horses; and one object thereof is to provide an improved device of this class by means of which a number of horses may be hitched in their stalls and all simultaneously unhitched whenever necessary, a further object being to provide a device of the class specified which may be operated either to release the horses all together or one at a time.

The invention is fully disclosed in the following specification, of which the accompanying drawings form a part, in which the separate parts of my improvement are designated by the same reference characters in each of the views, and in which—

Figure 1 is a front elevation of the device or apparatus which I employ; Fig. 2, a section on the line 2 2 of Fig. 1, and Fig. 3 a plan view of the device or apparatus as shown in Fig. 1.

In the drawings forming part of this specification I have shown at 5 a support which may consist of one of the walls of a stable or of a beam, board, or any other device or arrangement to which my improved horse hitching and detaching apparatus can be secured, and in the practice of my invention I secure to the said support 5 at regular intervals, preferably one within each stall, a plate 6, provided with two projecting arms or bearings 7 and 8, the arm or bearing 8 being longer than the arm or bearing 7, and mounted in these arms or bearings and longitudinally movable therein is a bar 9, which is provided between the arms or bearings 7 and 8 with a block 10, rigidly secured thereto, and it will be understood that one of these blocks 10 is provided for each of the plates 6.

The blocks 10 project in the same line with and beyond the arms or supports 8, and each is provided with a longitudinal slot 11, which opens outwardly, and mounted on each of the arms 8 is a sliding lock-piece 12, and said sliding lock-pieces are adapted to pass through the ends of the blocks 10 and through the slots 11, formed therein.

The lock-pieces 12 may be made longitudinally adjustable in any desired manner and may be provided with any suitable means for locking them in the position shown at the left of Figs. 1 and 2; but in the drawings forming part of this specification I have shown said lock-pieces as flat in form and provided each with a longitudinal slot 13, and a pin 14 is used in connection with each lock-piece and passes through the slot 13 therein and into the arm or support 8, on which the lock-pieces 12 are placed, and each lock-piece is also provided at its inner edge with a notch or recess 15, and a vertically-movable lock-pin 16 is passed downwardly through each of the arms or supports 8 and adapted to fit in the notch or recess 15, and when the lock-pieces 12 are in the position shown at the left of Figs. 1 and 2 they are secured in position and cannot be moved, and in order to move them the lock-pins 16 are moved upwardly by pressure applied to the lower ends thereof, and said lock-pins are provided with a notch or recess 17, and when this notch or recess is above the upper surface of the arm or support 8 the corresponding lock-piece 12 may be moved longitudinally of the bar 9, as will be readily understood.

The lock-pins 16 are preferably provided with a head at both ends or with a head at one end and with a nut at the other, and the normal position of the lock-pieces 12 is that shown at the left of Figs. 1 and 2, and when said lock-pieces are in this position the bar 9 is at its limit of movement to the right and the horses will be secured. It will be understood that the horses are provided each with a chain 17, which is connected with a halter, and said chain or chains are provided with a link or ring 18, or instead of a link or ring a snap-hook may be employed, and when a snap-hook is employed and the bar 9 is in the position shown in Fig. 2 the snap-hook is passed down through the slot 11 in the end of the block 10 and engaged with the lock-piece 12, which projects through said block and said slot, and any desired number of horses may be thus hitched. I also pivot at 19 a lever 20, which is vertically arranged and provided at its lower end with a slot 21, through which is passed a pin 22, secured to the bar 9, and the upper end of the lever 20 passes downwardly through a horizontally-arranged plate 23 and through a longitudinal slot 24, formed therein, and secured at the right of the lever 20 is a spring 25, which is also connected with said lever and normally operates to draw the upper end thereof to the right.

Pivotally above the plate 23 at 26 is a lever 27, one end of which projects to the right along the upper surface of the plate 23 and is provided with an outwardly-directed head 28, which is adapted to engage with the lever 20 and hold it in position, as shown in Figs. 1 and 3 of the drawings, and the opposite end of said lever 27 is provided with a chain or other flexible device 29. By pulling downwardly on the chain or other flexible device 29 the opposite end of the lever 28 will be thrown backwardly against the operation of a spring 30, which bears against the same, and the lever 20 will be released and will be thrown to the right by the spring 25. This operation will throw the bar 9 to the left and will disconnect the blocks 10 from the lock-pieces 12, and the snap-hooks, rings, or other devices 8 will be released, as will be readily understood, and any desired number of horses may thus be instantaneously released at the same time.

At the right of Figs. 1 and 2 I have shown the blocks 12 drawn outwardly, and it will be understood that by means of this construction a horse or any number of horses may be separately hitched or released whenever desired.

This apparatus is simple in construction and operation and well adapted to accomplish the result for which it is intended, and it will be apparent that changes in and modifications of the construction herein described may be made without departing from the spirit of my invention or sacrificing its advantages.

Having fully described my invention, what I claim as new, and desire to secure by Letters Patent, is—

1. In an apparatus for hitching and unhitching horses a support, brackets or plates secured thereto and provided with projections or arms, a bar mounted in said projections or arms and longitudinally movable, blocks secured to said bar between said projections or arms and extending parallel therewith, and provided in the outer ends with longitudinal slots or openings, a lock device mounted on one of said projections or arms of each plate or support and longitudinally movable thereon, and means for locking or securing said locking devices, said locking devices being adapted to pass through the outer ends of said blocks, and through the slot formed therein a spring-operated lever connected with said bar and a locking-lever pivotally supported adjacent to the first-named lever and adapted to hold it against the operation of the spring, substantially as shown and described.

2. In an apparatus of the class described, a support, a plurality of projecting arms secured thereto and arranged in pairs, a bar mounted in said arms and longitudinally movable therein, blocks secured to said bar between the members of each pair of arms and projecting parallel therewith and provided in the outer ends each with a slot or opening, a locking device mounted on one member of each of said pair of arms and longitudinally movable thereon and adapted to pass through the outer end of the adjacent block and through the slot formed therein, devices for securing said locking devices in position and means for operating said bar, substantially as shown and described.

In testimony that I claim the foregoing as my invention I have signed my name, in presence of the subscribing witnesses, this 14th day of November, 1900.

DEWITT C. FULTON.

Witnesses:
F. A. STEWART,
LOUIS A. GUIDICE.